Aug. 7, 1962     G. D. JONES     3,048,020

THERMOELECTRIC FOOD KEEPER

Filed June 2, 1961

INVENTOR.
GARY D. JONES

BY *Walter E. Gale*

HIS ATTORNEY

United States Patent Office 3,048,020
Patented Aug. 7, 1962

3,048,020
THERMOELECTRIC FOOD KEEPER
Gary D. Jones, Louisville, Ky., assignor to General Electric Company, a corporation of New York
Filed June 2, 1961, Ser. No. 114,447
3 Claims. (Cl. 62—3)

The present invention relates to a thermoelectric food keeper in the form of a portable heating or cooling appliance of light weight and compact construction.

More specifically, the invention is concerned with, and has as its principal object the provision of, a food keeper comprising a thermoelectric heat pump adapted to be operated from a low voltage direct current supply and including means for preventing heat leakage through the thermoelectric elements of the heat pump when the appliance is disconnected from its power source.

Presently available, portable, light weight food keepers, are in the form of the so-called "picnic jugs" and "ice chests" which can be broadly described as comprising insulated containers adapted to be filled with either hot or iced foodstuffs or beverages. The total period of time during which the contents of these food keepers will be maintained at the desired storage temperatures is relatively short and depends upon the quality of the insulation and ambient temperature conditions. For example, the usual gallon size picnic jug will keep an iced beverage cold for only about six hours on a hot day. At the end of this time much of the ice is melted and of course the strength of the beverage decreases as the ice melts. Ice chests designed to keep food cold for longer periods of time normally include a separate compartment for ice. These chests however are heavy and bulky and since as much as three-fourths of the internal volume thereof may be filled with ice, their total weight detracts substantially from their portability.

The use of a thermoelectric heat pump for cooling or heating food keepers of this type greatly improves their usefulness. A thermoelectric heat pump unit adapted to operate from a low voltage direct current source adds very little to the overall weight of the food keeper yet provides means whereby the contents thereof can be maintained either hot or cold for any length of time merely by connecting the thermoelectric heat pump to a suitable low voltage direct current source such as the battery of a car or boat. A thermoelectric heat pump for this purpose comprises a plurality of series-connected thermoelectric elements arranged in at least one wall of the food keeper to provide a plurality of inner junctions in heat exchange relationship with the interior of the food keeper and a plurality of outer junctions in heat exchange relationship with an outer surface thereof. In the operation of the heat pump, a low voltage direct current is passed through the elements in one direction to obtain, by the Peltier effect, a cooling of the inner junctions and in the opposite direction to obtain a warming of the inner junctions. As long as a suitable direct current is passed through the elements, one set of junctions will be maintained at a low temperature while the other set will be at a more elevated temperature. As is well known the heating or cooling effect of the respective junctions are functions of the temperatures of the junctions, the current flowing and the thermoelectric power of the junctions. The net cooling or heating power of the junction is however less than the calculated value due in part to the conduction of heat from the hot junction to the cold junction through the materials of the elements. This heat conduction from the hot to the cold junctions takes place whether or not a current is being passed through the elements and when current is not flowing, the heat leakage through the individual thermocouples is quite high.

In accordance with the present invention, and for maintaining the desired storage temperatures within the food keeper during periods when no current is being passed through the elements, there is provided a food keeper including a thermoelectric heat pump and a removable insulating cover adapted to completely cover and enclose the outer junctions of the thermoelectric elements in order to minimize heat leakage and help maintain the internal temperatures of the food keeper when the power is off. With the power off and the insulating cover on or in place, the food keeper thus becomes a well insulated container capable of maintaining the desired container temperatures for about the same period of time as the usual picnic jug or ice chests. Furthermore, whenever the container temperatures begin to deviate from the desired temperature, it is necessary only to reconnect the thermoelectric food keeper to a source of power for a time sufficient to re-establish the desired storage temperatures within the food keeper.

Various additional features and advantages of the invention will become apparent from the following description of the invention in which reference is made to the accompanying drawing wherein.

Figure 1:
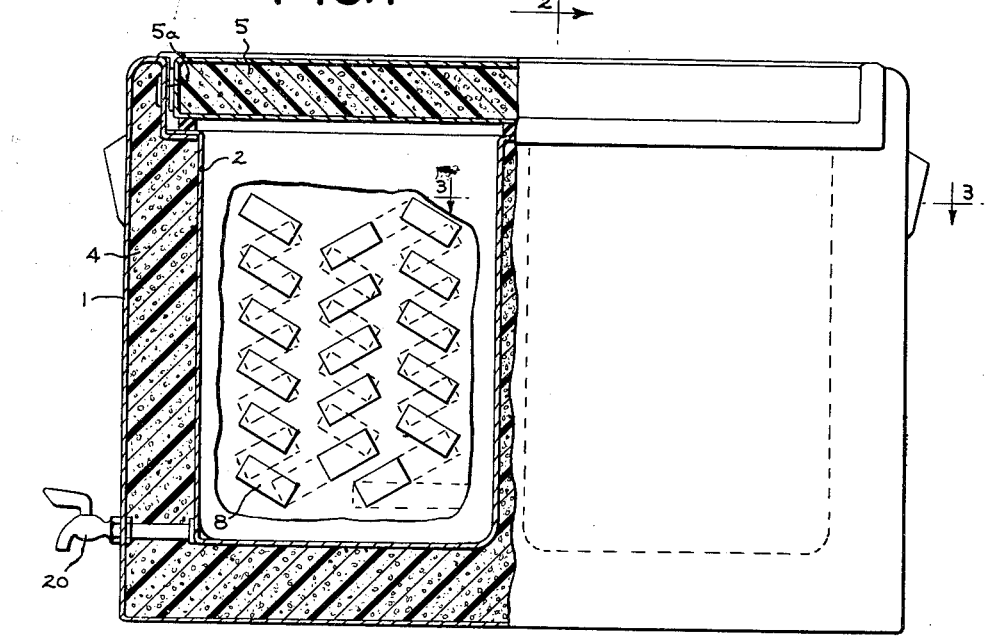
FIG. 1 is a view partially in section of the appliance of the present invention.

With reference to the drawing, there is shown an embodiment of the food keeper of the present invention as comprising an outer case 1 and two inner compartments or containers 2 and 3 in spaced relation with the casing 1. The compartments 2 and 3 are surrounded by suitable heat insulation 4 such as a foamed resin material. The containers 2 and 3 are open at the top and the access openings thereto are closed by means of an insulated lid 5 pivotally secured to the body of the food keeper by hinges 5a.

For the purpose of cooling or warming the contents of the compartments 2 and 3, there is provided a thermoelectric heat pump including a plurality of thermoelectric elements 6 arranged in the rear wall 7 of the food keeper. These elements, which are of the well-known type, comprise two materials having dissimilar thermoelectric properties serially connected by means of junction straps 8 and 9 to provide, in accordance with the well known Peltier principle, a plurality of inner junctions represented by the straps 8 and a plurality of outer junctions represented by the straps 9. When a direct current is passed in one direction through the elements, heat is absorbed by the straps 8 which are in heat exchange relationship with the containers 2 and 3 and is dissipated by the outer straps 9. When the current is reversed, the temperatures of the junctions are also reversed. To facilitate the heat dissipation or absorption by the outer straps 9 there is provided in heat exchange therewith a finned metallic plate 10 having a plurality of vertically extending fins 11. This plate is preferably composed of aluminum or other material having a good heat conductivity and is designed to have a low thermal mass. Also in accordance with the well-known practice the individual thermocouple or thermoelectric elements or more specifically the inner and outer straps 8 and 9 are electrically insulated by a thin resin film from the containers 2 and 3 and from the heat exchange element 10 in order to prevent short circuiting of the elements. The space between the inner and outer straps 8 and 9 or, in other words, the space between the containers 2 and 3 and the finned heat dissipating element 10 is filled with suitable resin foam insulation or equivalent insulation.

The thermoelectric heat pump is designed to be energized by connection to a low voltage direct current supply such as one or more of the two volt cells of a storage battery of an automobile or boat. For that purpose, there is provided a supply line 12 comprising a pair of conductors having one end thereof connected to a switch 14 and the other end to a connector 15 adapted to be plugged into the cigarette lighter outlet of an automobile or equivalent receptacle. The switch 14 is in series circuit with the thermoelectric elements and may be of any suitable design adapted to reverse the flow of current through the elements in order to obtain either heating or cooling of the containers 2 and 3 or if desired also to vary the current flowing through the thermoelectric elements and thereby control the temperatures maintained within the containers 2 and 3.

Whenever the food keeper is connected by means of the plug 15 to a suitable D.C. supply source, the current flowing through the thermoelectric elements either cools the containers 2 and 3 or warms these containers depending upon the direction of current flow so that the contents of the containers 2 and 3 can be maintained at the desired storage temperatures so long as the food keeper is connected to the power source. Heat is absorbed by the cold set of junctions and dissipated by the hot set. However, as stated hereinbefore, heat is also conducted from the hot junctions to the cold junctions and, when the food keeper is disconnected from the power source, the heat leakage can rather quickly result in a substantial deterioration in the container storage temperatures due to the rapid dissipation or absorption of heat from ambient by the finned plate 10.

In accordance with the present invention, the finned heat exchanger 10 arranged on the outer surface of the rear wall 7 of the food keeper is provided with an insulating cover 17 secured to the outer case, for example by means of hinges 18, so that it can either be opened or totally removed whenever the heat pump is energized, and closed to prevent heat leakage through the thermoelectric elements whenever the food keeper is disconnected from its power supply. The cover 17 is designed to provide a substantial insulating effect comparable to the remaining walls of the container so that, when the power is off and the cover 17 in place, the food keeper becomes a well insulated food container capable of maintaining storage temperatures for about the same period of time as the known picnic jugs and the like.

Figures 2, 3:
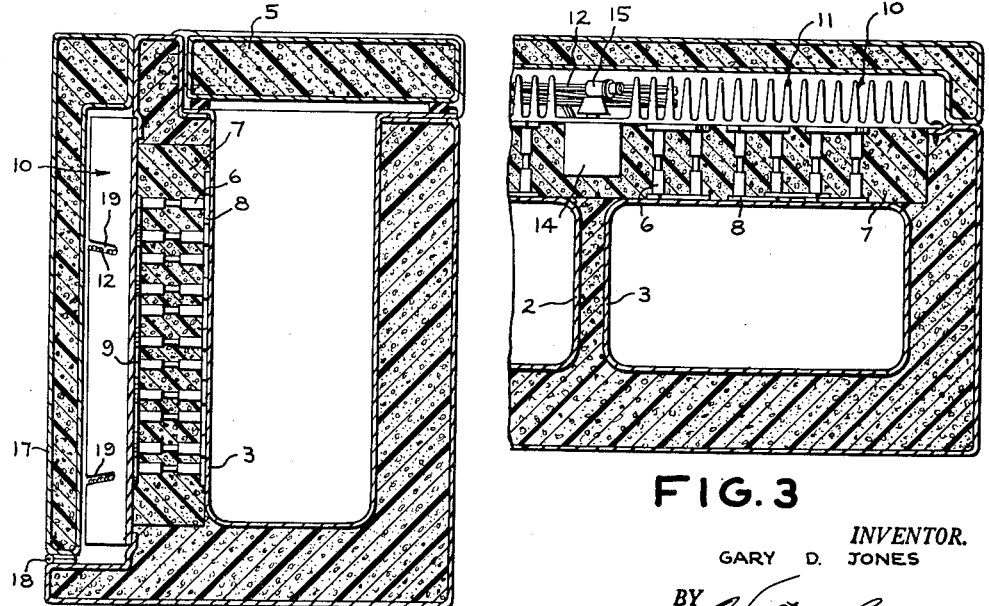
FIG. 2 is a sectional view along line 2—2 of FIG. 1.
FIG. 3 is a sectional view along line 3—3 of FIG. 1.

The cover 17 must of course be opened or removed whenever the food keeper is connected to a power supply in order that the heat dissipating plate 10 will either dissipate or absorb heat from the surrounding atmosphere depending upon whether or not the outer straps 9 are operating as hot or cold junctions. To assure that the cover will be opened at such times, the connecting cord 12 and plug 15 are designed to be stored within a space adjacent the switch 14 so that plug 15 cannot be connected to a power source unless the cover 17 is open. To this end, as illustrated in FIG. 3, of the drawing the fins 11 on each side of the switch 14 are provided with converging slots 19 for receiving and storing the cord. With the cord connected to the food keeper in this manner, it cannot be connected to a power supply without opening the cover 17. Likewise the cover 17 will not unwittingly be closed by the user until the cord is disconnected from the power source and returned to its storage area.

The compartments 2 and 3 may of course be used for the storage of either liquid or solid foodstuffs. For convenience, one or both of the compartments can be provided with a spigot 20 for dispensing liquids contained therein.

While there has been shown and described a particular embodiment of the present invention, it will be understood that it is not limited thereto and it is intended to cover in the appended claims all modifications thereof falling within the scope of the invention.

What I claim as new and desire to secure by Letters Patent of the United States is:

1. A portable heating and cooling appliance comprising insulated walls defining a storage compartment, a plurality of thermoelectric elements arranged in one of said walls to provide a plurality of inner junctions in heat exchange relationship with said compartment and a plurality of outer junctions in heat exchange relationship with the outer surface of said one wall, means for connecting said elements to a direct current power source, and a removable insulating cover for insulating said outer junctions from the ambient temperature conditions when said appliance is disconnected from said power source.

2. A portable heating and cooling appliance comprising insulated walls defining a storage compartment having an access opening, an insulated door for closing said access opening, a plurality of thermoelectric elements arranged in one of said walls to provide a plurality of inner junctions in heat exchange relationship with said compartment and a plurality of outer junctions in heat exchange relationship with the outer surface of said one wall, means for connecting said elements to a direct current power source, a finned heat exchanger on the outer surface of said one wall in heat exchange with said outer junctions, and a removable insulating cover for covering and insulating said outer junction and finned heat exchanger from ambient temperature conditions when said appliance is disconnected from said power source.

3. A portable heating and cooling appliance comprising insulated walls defining a storage compartment having an access opening, an insulated door for closing said access opening, a plurality of thermoelectric elements arranged in one of said walls to provide a plurality of inner junctions in heat exchange relationship with said compartment and a plurality of outer junctions in heat exchange relationship with the outer surface of said one wall, a heat exchanger having fins thereon in heat exchange with said outer junctions, an electrical cord for connecting said elements to a direct current power source, a removable insulating cover for covering said one wall and insulating said outer junctions from the ambient temperature conditions when said appliance is disconnected from said power source, said fins including cord-receiving slots for storing said cord when disconnected from said power source said cord passing through said one wall whereby said cord cannot be connected to said power source unless said cover is open.

References Cited in the file of this patent
UNITED STATES PATENTS
2,964,912    Roeder _____ Dec. 20, 1960